Oct. 5, 1954 A. L. WALLACE 2,690,591
VULCANIZING MOLD HAVING INTERLOCKING SEGMENTS
Filed Sept. 8, 1950 3 Sheets-Sheet 1

INVENTOR.
ARCHIBALD L. WALLACE
BY
Lyman E. Dodge
ATTORNEY

Oct. 5, 1954 A. L. WALLACE 2,690,591
VULCANIZING MOLD HAVING INTERLOCKING SEGMENTS
Filed Sept. 8, 1950 3 Sheets-Sheet 2

INVENTOR.
ARCHIBALD L. WALLACE
BY
Lyman E. Dodge
ATTORNEY

Oct. 5, 1954  A. L. WALLACE  2,690,591
VULCANIZING MOLD HAVING INTERLOCKING SEGMENTS
Filed Sept. 8, 1950  3 Sheets-Sheet 3

INVENTOR.
ARCHIBALD L. WALLACE
BY
Lyman E. Dodge
ATTORNEY

Patented Oct. 5, 1954

2,690,591

UNITED STATES PATENT OFFICE 2,690,591

VULCANIZING MOLD HAVING INTERLOCKING SEGMENTS

Archibald L. Wallace, Mountain Lakes, N. J.

Application September 8, 1950, Serial No. 183,804

4 Claims. (Cl. 18—6)

This invention relates to a vulcanizing device.

A principal object of this invention is to provide a mold for vulcanizing which may be deformable.

A further object of the invention is to provide a vulcanizing mold which is deformable and which is also made of elastic or spring metal.

A further object of the invention is to produce a vulcanizing mold of sheet material.

Other and further objects of the invention will appear as the description of the particular physical embodiment selected to illustrate the invention progresses and the novel features will be particularly pointed out in the appended claims.

Figure 1:
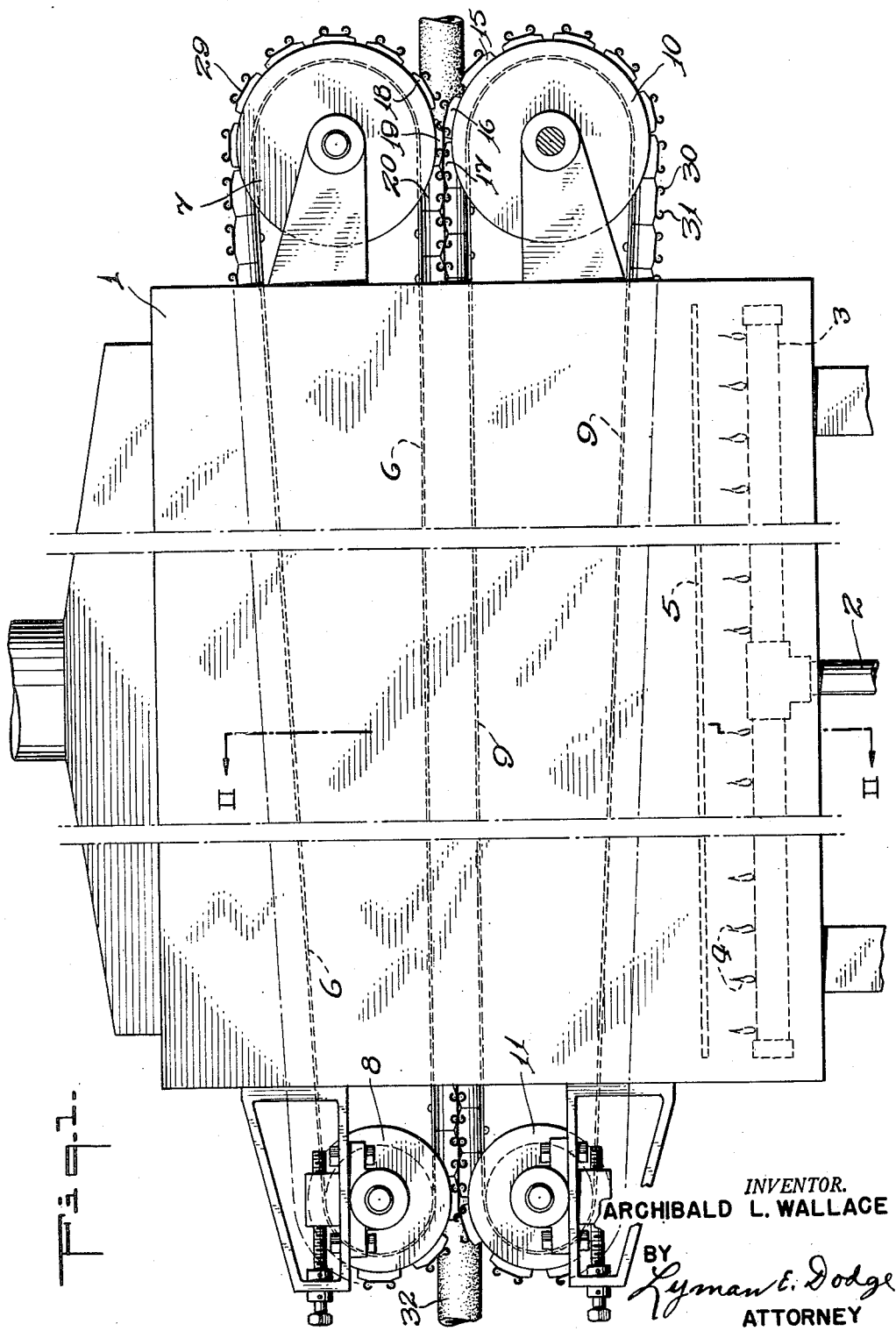
Figure 2:
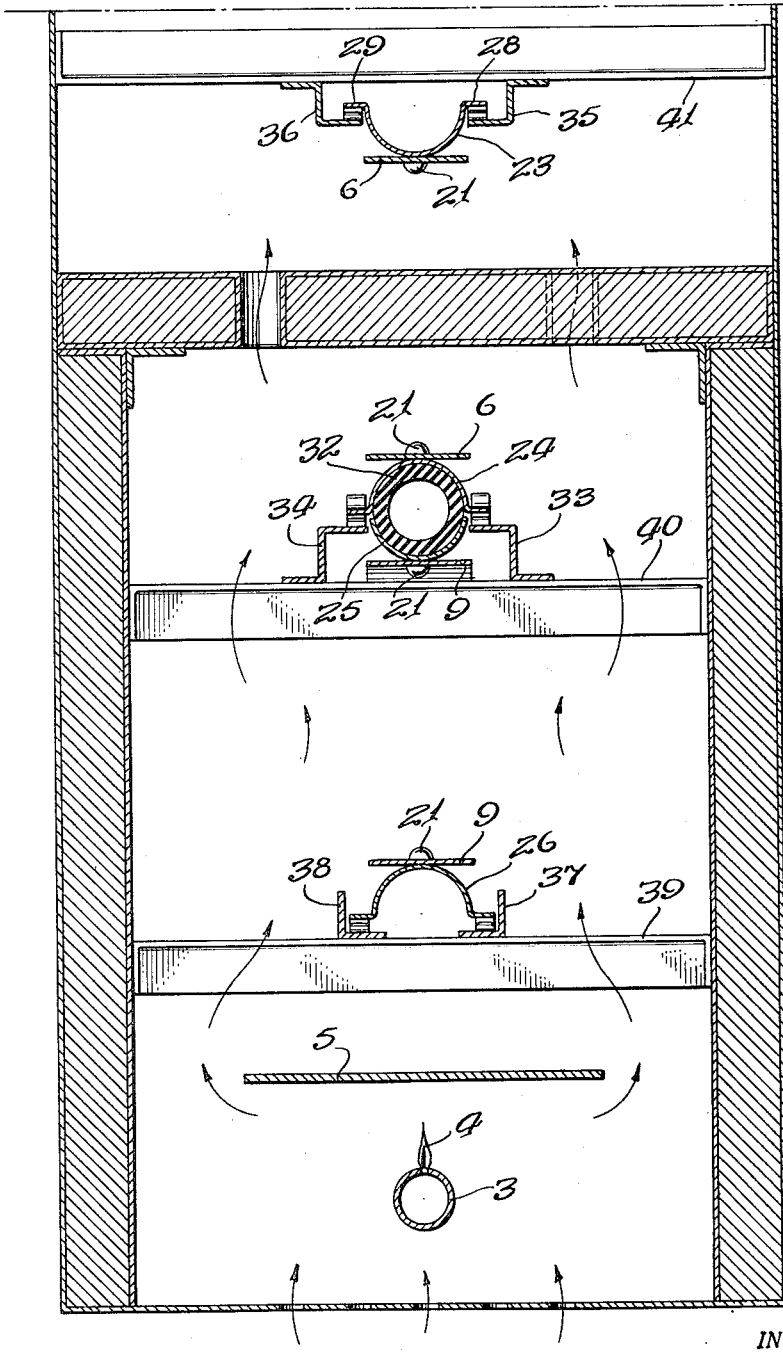
Figure 3:
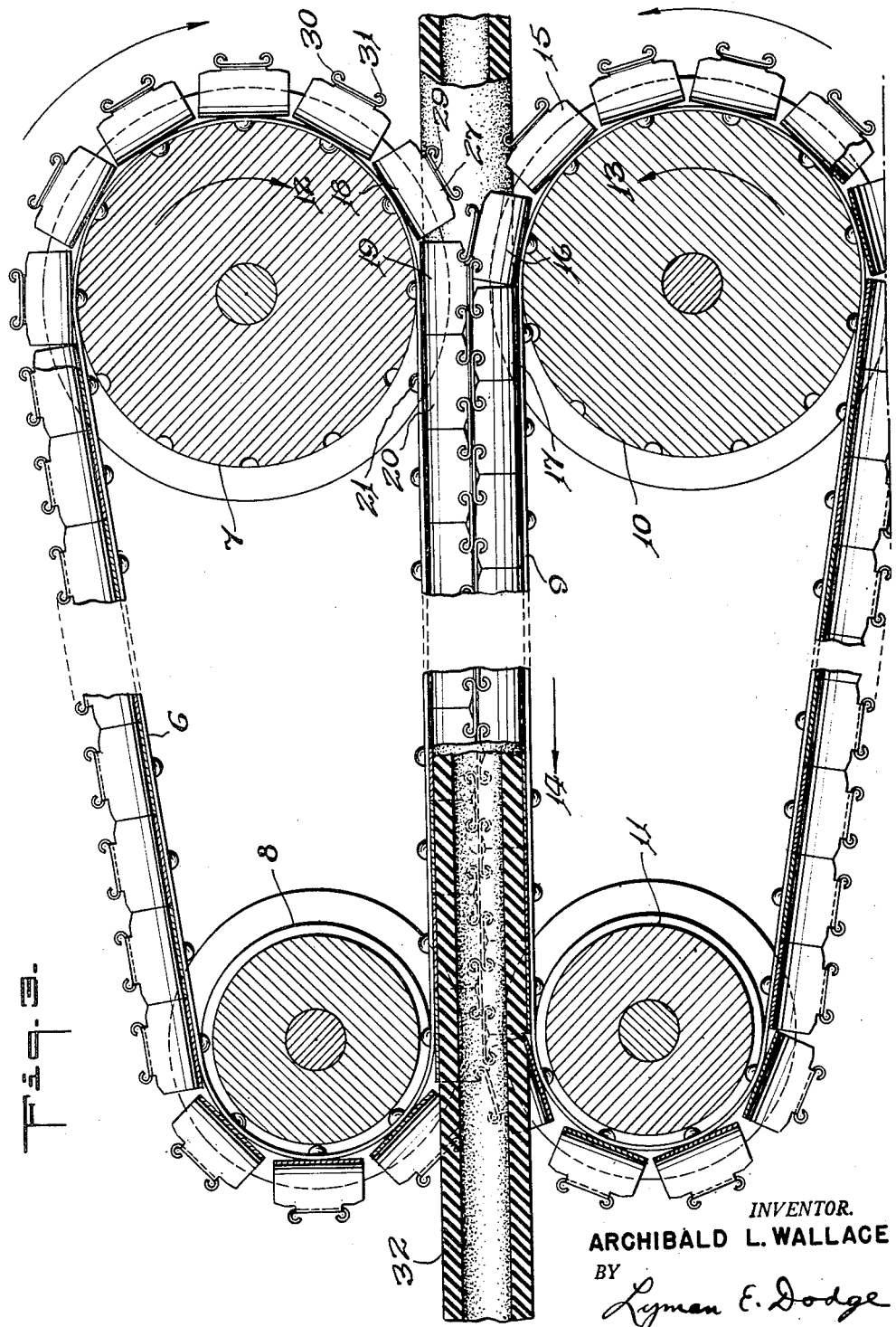

In describing the invention in detail and the particular physical embodiment selected to illustrate the invention, reference will be had to the accompanying drawings and the several views thereon, in which like characters of reference designate like parts throughout the several views, and in which:

Fig. 1 is a side elevational view of a vulcanizing device embodying my invention; Fig. 2 is a cross sectional view of the device as shown by Fig. 1 on the plane indicated by the line II—II viewed in the direction of the arrows at the ends of the line; Fig. 3 is a fragmentary side elevational view, showing some parts in section, of the device as shown by Fig. 1.

It is well understood by those skilled in the art of vulcanizing that articles made mainly of natural or synthetic rubber or rubber substitutes of the same general nature as synthetic rubber, must be vulcanized in order to give proper service in many cases. If the article to be vulcanized is of not too large dimensions, it is quite easy to provide a machine which will receive the entire article to be vulcanized, but in many cases, particularly in the case of such articles as hose, which are required in very long pieces or lengths, it is impracticable to make a machine which is of such construction that it will subject the entire lengths of the article to vulcanization at any one time. This has necessitated the devising of vulcanizing machines, known as continuous vulcanizing machines, by which such large or long articles may be vulcanized in what is known as a continuous process, that is, machines which allow the article to be vulcanized to be passed therethrough with part of the article protruding from either end of the machine and intermediate portions only being successively subjected to the vulcanization process.

In general, machines for continuous vulcanizing comprise a chamber in which the temperature is suitably elevated and means to properly support, surround and maintain in proper form, the article to be vulcanized together with means for advancing the article at a proper rate through the vulcanizing chamber.

My invention is directed to the mold segments which interlock and embrace the article being vulcanized.

In Fig. 1 a vulcanizing chamber 1 is shown. This chamber may be of any of the usual and conventional designs and may have the temperature therein elevated by any suitable or appropriate means, such as by the burning of gas therein. This gas may, in accordance with ordinary usage, be introduced by the pipe 2 to the interior distributing pipe 3 which may be provided with a plurality of small openings through which the gas may issue and, upon being ignited, burn, forming the flames as 4. A baffle 5 may be positioned above the gas flames so that the heat, instead of being allowed to impinge directly upon the article to be vulcanized or the molds surrounding the article, will be distributed more uniformly.

The particular means which I have illustrated in the drawings to support and actuate my mold segments include a flexible belt 6, of the endless type, which passes over pulleys 7 and 8. I also use a precisely similar endless belt 9 passing over pulleys 10 and 11 and lying for a large portion of its length parallel to belt 6. The belts 6 and 9 are preferably made of metal and preferably steel. They are passed around their respective pulleys in such manner that when pulleys 7 and 10 which may be called the driving pulleys are actuated so as to rotate in the direction of the arrows 12 and 13, the belts 6 and 9 are moved both in the direction of the arrows 14.

To each of the belts are attached a series of segments 15, 16, 17, 18, 19 and 20. These segments are each attached to a belt by any suitable or appropriate means, preferably by a rivet as 21. As best shown by Fig. 2, the segments are somewhat semi-circular in cross section as shown at 23, 24, 25 and 26. They are not precisely semi-circular but only approximately so when in what I call a free condition, that is, when the segments of one series are not in engagement with the segments of the other series as illustrated by segments 23 and 26. These segments may be considered to be approximately semi-circular or approximately one-half a hollow cylinder or semi-cylindrical in form.

I prefer to construct the segments of sheet material which is springy or elastic. I prefer what might be called a sheet material, that is, a material such as sheet steel of an appropriate thickness. This thickness may be quite widely varied from one-sixteenth of an inch both upwardly and downwardly, but always within a range such that the segment may be deformed in the manner hereinafter to be described.

Each of the segments has a portion of the sides thereof formed with a continuation or extension, as 27, which is of a length substantially the same as the thickness of the material of which the segment is made. Each segment, at each side edge thereof, as best shown in Fig. 2, has a right angle projection as 28 and 29, and this right angle projection has its ends bent over as at 30 and 31. This right angle projection may be considered as at a right angle to the tangent to the outside curve of the mold segment at the springing point of the projection.

All of the segments are constructed precisely alike and they may be considered as approximately semi-circular in shape or as half an annulus or as half a hollow cylinder of which the wall is the body of the segment.

When all of the segments have been mounted on the belts 6 and 9, an uncured or unvulcanized extruded rubber pipe or hose may have one end presented to the meeting segments 16 and 19 whereupon it will be drawn in and embraced by the segments 16 and 19, and the segments thereafter following 16 and 19, so that in time the uncured rubber hose, 32, will appear as shown in Fig. 3 with a considerable length embraced by the meeting and interengaging segments. In short if the hose is presented to the right hand end of the device as shown by Fig. 1 as it goes through the heated zone caused by flames 4 it will be exposed to the heat and be suitably cured at the time it reaches the left hand end of the device as shown in Fig. 1, meanwhile being subjected to compression by the interengaging segments.

In practice it is common to apply air pressure to the inside of the hose while passing through the vulcanizer and this, of course, will be done in the usual and ordinary way so that the rubber hose will be kept inflated as is usual.

As the segments 15 and 18 approach one another they will first arrive at the condition as shown by segments 16 and 19 with the outside projections of segment 16 lying over the outstanding projections of segment 19. As the segments proceed they will then go into the position as shown by segments 17, 18, 19 and 20, that is, adjacent segments of one series will abut on each other as 19 and 20, and segments of one series will interengage with the segments of the other series with the center of the series on belt 9 opposite the junction point of the segments on belt 6.

As the segments come together and interengage the outstanding projections as 28 and 29 exert a mutual force, one against the other, so that the segments which, before engagement, were approximately semi-circular in cross section become semi-circular in cross section as shown by 24 and 25 of Fig. 2. This action deforms each of the segments and causes each of the segments to bear tightly against the outer periphery of the rubber hose being treated.

It is quite obvious that applicant's arrangement of vulcanizer is such that rubber hose may be cured or vulcanized in any lengths, that is, it is a continuous process machine.

Applicant's segments being made, preferably of steel, and of sheet material, may be easily constructed from ordinary commercial steel sheets. They may be first punched out to the proper dimensions and formed and may then be formed by simple operations into the form as shown in the drawings.

The use of segments as molds greatly decreases the cost and the time required to produce the large number of segments needed on a machine.

As, at times, the belts 6 and 9 may be very long, it may be wise to interpose supports between the pulleys 7 and 8 and 10 and 11. This is shown in Fig. 2 where the supports 33 and 34 sustain these segments while interengaged and the supports 35 and 36 sustain the segments on belt 6 while returning to pulley 7 and the supports 37 and 38 sustain the segments on belt 9 while returning to pulley 10. These several supports are mounted on appropriate cross bars as 39, 40 and 41 of the vulcanizing chamber 1.

The heat from the flames 4 flows upward within the vulcanizing chamber as shown by the arrows in Fig. 2 and out at the top, meanwhile coming in contact with the rubber hose 32, and suitably curing it.

It is to be understood that the driving pulleys 7 and 10 are driven themselves from any suitable or appropriate means as is common in the industry and may be driven at an appropriate speed so that the time of passage of the rubber hose to the heat zone will be precisely as desired to give the particular degree of curing wanted.

Although the mold segments may be made of elastic or spring metal so that they may initially be other than an exact semi-circle in cross section, but after being interengaged with mating segments become substantially semi-circular, I may make the segments substantially semi-circular and obtain the resiliency or springiness which I desire by making the outstanding projections, as 29, of such a length relative to the length of the segments that when the ends 30 and 31 are interengaged with the corresponding parts on the opposing segments, I may get just the amount of springiness in the connection that I desire.

It is to be understood that in using the device hereinbefore described for vulcanizing that I also will take advantage of the prior art and also my own prior inventions, that is, that between the mold segments and the article to be vulcanized there will be overlapping longitudinal strips all in accordance with the prior art as shown by my Patent No. 2,154,791, dated April 18, 1939, and in my prior Patent No. 2,187,254, dated January 16, 1940.

It is also to be understood that although I have illustrated and described my invention in what might probably be its most commonly used form, that is, as a means for vulcanizing an article which is substantially circular in cross section, that it is to be understood that my mold segments are not confined to segments which are semi-circular in cross section or substantially a semi-annulus, because I do not mean to exclude various and other sundry forms of molds suitable for vulcanizing articles, the cross section of which is other than circular as it is well known that such articles as belts, of substantially rectangular or triangular cross section are made of rubber with perhaps supplementary material and vulcanized, and it is evident that my apparatus is suitable for the vulcanization of such articles. It is also well known that various other rubber articles may be made in great length and then cut to the desired length, which are other than circular in cross section, such as window stripping and door stripping. Such devices may be vulcanized by my apparatus, but, of course, the shape of the mold segments must be altered to correspond to the particular article that it is desired to vulcanize.

Although I have particularly described one particular physical embodiment of my invention, nevertheless I desire to have it understood that the form selected is merely illustrative and does not exhaust the possible physical embodiments of the idea of means underlying my invention.

What I claim is:

1. A mold for a vulcanizer formed of a plurality of approximately semi-circular in cross section deformable segments in two series, one series reversely positioned to the other, each segment provided with interengaging means identical with that of all other segments, said means comprising arms, one projecting from each extremity of each segment, each arm of a segment of one series being of a length to somewhat lap over the ends of arms of the adjacent segments in the opposite series, means to bring the arms into interengagement.

2. A mold for a vulcanizer formed of a plurality of identical approximately semi-cylindrical sheet metal segments in two series, the segments of one series being staggered one-half the length of a segment as regards the other series, one series reversely positioned to the other, each segment provided with interengaging means, said means on each segment including extensions, one on each side extremity of each segment as long as the thickness of the sheet metal of the segment, and arms one extending from each said extension at a right angle thereto and means for moving the segments of the two series into substantially parallel abutting relation whereby the arms of one series interengage the arms of the other series.

3. A mold for a vulcanizer, including, in combination, a first belt, a second belt, means for causing a portion of one belt to lie substantially parallel to a portion of the other belt, a plurality of approximately semi-circular in cross section deforming segments attached to the first belt, a plurality of approximately semi-circular in cross section deformable segments attached to the second belt, each segment on each belt along the parallel portion of the belt abutting adjacent segments on the same belt, each segment provided with arms, one arm projecting from each extremity of each semi-circular segment, the arms of the segments on the parallel portion of one belt being directed toward the arms of the segments on the parallel portion of the other belt, said arms for a portion of their length at each end being free from the body of the segment, means for moving the belts whereby the arms of the segments on one belt interengage with the arms of the segments on the other belt along the parallel portion of the belts, said segments being formed of sheet metal and said arms being positioned to deform the segments to semi-circular form when the arms interengage.

4. A mold for a vulcanizer formed of a plurality of approximately semi-cylindrical sheet metal segments in two series, one reversely positioned to the other, the segments of one series being staggered one-half the length of a segment as regards the segments in the other series, each segment provided with identical interengaging means, said means on each segment including arms, one arm projecting from one extremity of a segment and one arm projecting from the other extremity of the same segment, each end of each said arms bent over on itself whereby the arms of one series of segments may be interengaged with the arms of the other series of segments, and means for moving the segments into engagement.

References Cited in the file of this patent

UNITED STATES PATENTS

| Number | Name | Date |
|---|---|---|
| 1,049,688 | Eggers | Jan. 7, 1913 |
| 1,359,919 | Reardon | Nov. 23, 1920 |
| 1,576,061 | Pade | Mar. 9, 1926 |
| 1,875,816 | Krause | Sept. 6, 1932 |
| 1,905,663 | Wallace | Apr. 25, 1933 |
| 1,949,226 | Wallace | Feb. 27, 1934 |
| 2,210,000 | Peel | Aug. 6, 1940 |
| 2,336,578 | Skoning | Dec. 14, 1943 |
| 2,461,600 | Gray | Feb. 15, 1949 |